(12) United States Patent
Tsuji

(10) Patent No.: US 9,330,293 B2
(45) Date of Patent: May 3, 2016

(54) ARTICLE WITH VISUAL CODE, VISUAL CODE READING APPARATUS AND INFORMATION CONVEYING METHOD

(71) Applicant: Susumu Tsuji, Tokyo (JP)

(72) Inventor: Susumu Tsuji, Tokyo (JP)

( * ) Notice: Subject to any disclaimer, the term of this patent is extended or adjusted under 35 U.S.C. 154(b) by 0 days.

(21) Appl. No.: 14/566,836

(22) Filed: Dec. 11, 2014

(65) Prior Publication Data

US 2015/0186704 A1 Jul. 2, 2015

(30) Foreign Application Priority Data

Dec. 26, 2013 (JP) .................................. 2013-268695

(51) Int. Cl.
*G06K 19/06* (2006.01)
*G06K 7/14* (2006.01)

(52) U.S. Cl.
CPC ............ *G06K 7/1443* (2013.01); *G06K 7/1417* (2013.01); *G06K 19/06037* (2013.01); *G06K 19/06056* (2013.01); *G06K 19/06103* (2013.01); *G06K 19/06131* (2013.01)

(58) Field of Classification Search
CPC .................. G06K 19/06037; G06K 19/06103; G06K 19/06056; G06K 19/06131; G06K 19/06; G06K 19/06009; G06K 19/06046; G06K 19/06093; G06K 2019/06262; G06K 19/06018; G06K 19/096028; G06K 7/1417; G06K 7/1443; G06K 7/1447; G06K 7/1452; G06K 7/1456; G06K 7/1408; G06K 7/1413; G06K 7/1426
See application file for complete search history.

(56) References Cited

U.S. PATENT DOCUMENTS

| 5,541,396 | A | * | 7/1996 | Rentsch | ........... | G06K 19/06037 235/454 |
| 8,322,627 | B2 | * | 12/2012 | Hovis | ............... | G06K 19/06037 235/455 |
| 2007/0086638 | A1 | * | 4/2007 | Ackley | ................ | G06F 17/3002 382/132 |
| 2009/0306910 | A1 | * | 12/2009 | Hovis | ............... | G06K 19/06037 702/42 |
| 2013/0001296 | A1 | | 1/2013 | Tsuji | | |

FOREIGN PATENT DOCUMENTS

| CH | WO 2007107533 A2 * | 9/2007 | ....... G06K 19/06037 |
| JP | 4629788 B1 | 11/2010 | |
| JP | EP 2515258 A1 * | 10/2012 | ............... G06K 7/10 |

* cited by examiner

*Primary Examiner* — Michael G Lee
*Assistant Examiner* — Suezu Ellis
(74) *Attorney, Agent, or Firm* — Studebaker & Brackett PC

(57) ABSTRACT

An article to which a visual code is attached, wherein the visual code includes: a frame pattern which is formed in the shape of a polygonal or round ring by arranging multiple pattern elements; a symbol pattern placing area which is formed inside the frame pattern, and in which a symbol pattern can be placed; an internal information pattern which is formed as a part of the frame pattern and indicates the presence or the absence of the symbol pattern in the symbol pattern placing area; and a guide pattern which is placed on, inside or near the frame pattern, and is used for a visual code reading apparatus having an optical reading function to recognize a positional relationship between the frame pattern and the visual code reading apparatus.

4 Claims, 13 Drawing Sheets

FIG. 10

| Array of Symbol Patterns | Associated Information |
|---|---|
| B12 | S Station, B12, Exit Information: LM Driver's License Examination Center, PQR Branch Office, JK Tax Office, STU Department Store, EF Home Center, W Mart |

FIG. 11

| Symbol Pattern Absence Information | Non-associated Information |
|---|---|
| Unused Character Code | UNDER CONSTRUCTION This exit is closed due to construction work. So, please use another exit. |

1

ARTICLE WITH VISUAL CODE, VISUAL CODE READING APPARATUS AND INFORMATION CONVEYING METHOD

CROSS-REFERENCE TO RELATED APPLICATIONS

Priority is claimed on Japanese Patent Application No. 2013-268695 filed Dec. 26, 2013, which is incorporated herein by reference.

BACKGROUND OF THE INVENTION

The present invention relates to an article with a visual code which can visually and directly convey a message to humans, and can indirectly convey information linked to the message to humans by using an apparatus with an optical reading function, a visual code reading apparatus for reading such a visual code, and an information conveying method of visually and directly conveying a message to humans and indirectly conveying information linked to the message to humans by using an apparatus with an optical reading function.

A barcode (one-dimensional code) and a QR code (trademark) (two-dimensional code) are conventionally known as codes to be attached to an article or a product. The barcode is formed by arranging line segments in one direction, and it can be read by a line scanner. The QR code is formed by arranging dots on the two-dimensional plane, and it can be read by a scanner designed specifically for reading QR codes, or a mobile device with a built-in camera in which a software for reading QR codes is installed, etc.

It is easy for an apparatus with an optical reading function, such as a scanner, to read information from the array of line segments in the barcode or the array of dots in the QR code. However, it is impossible or difficult for humans to read information form it. It looks like a meaningless striped pattern or a cluster of dots arranged in random order for humans. Namely, neither the barcode nor the QR code expresses any messages which can be visually recognized or read by humans.

Therefore, each of the barcode and the QR code cannot attract any interest of buyers who browse products, even though, when it is attached to the products, it occupies a certain area of the surface of each product. In fact, attaching the barcode or the QR code to the products deteriorates the design of the products and reduces the appeal of the products.

In contrast to this, a visual code described in Japanese Patent Publication No. 4629788 can express both of information which can be easily and accurately read by an apparatus with an optical reading function, such as a scanner, and a message which can be visually recognized or read by humans, on a two-dimensional plane at the same time. The visual code is a code wherein a symbol arrangement pattern, which comprises a single symbol pattern or a plurality of symbol patterns which express a message which can be visually recognized by humans, is formed by selecting one or more than one region from among a plurality of regions arranged like a grid in a two-dimensional space, and placing a pattern element with a predetermined shape in each of the selected regions; each of the regions where the pattern element is placed so as to form the symbol arrangement pattern among the plurality of regions in the two-dimensional space indicates ON; each of the regions where the pattern element is not placed so as to form the symbol arrangement pattern among the plurality of regions in the two-dimensional space indicates OFF; and linked information which is different from the message is linked to binary information which is specified by the regions indicating ON and the regions indicating OFF, corresponds to the symbol arrangement pattern, and can be recognized by an apparatus with an optical reading function (see claim 1 and FIG. 2 of Japanese Patent Publication No. 4629788). Since the visual code can express a message which can be visually recognized or read by humans, it is possible to increase the design, appeal or allure of an article or a product to which the visual code is attached.

In order to express various messages in various ways, it is desirable to be able to include images, illustrations or photographs in a code attached to an article. If images, illustrations or photographs can be included as a medium for expressing a message in the visual code described in Japanese Patent Publication No. 4629788, it is possible to increase the design, appeal or allure of an article.

However, it is difficult to include images, illustrations or photographs in the visual code because the visual code described in Japanese Patent Publication No. 4629788 uses, as a medium for expressing a massage, a symbol pattern or a symbol arrangement pattern formed by placing pattern elements in regions arranged in the form of a grid.

BRIEF SUMMARY OF THE INVENTION

It is therefor an object of the present invention to provide an article with a visual code which can increase the design, appeal or allure of an article or a product by using not only a symbol pattern but also a picture, an illustration, a photograph or the like as a medium for expressing a message, in addition to having the function of visually and directly conveying a message to humans and indirectly conveying information linked to the message to humans by using an apparatus with an optical reading function.

An article according to one aspect of the present invention is an article to which a visual code is attached. The visual code includes: a frame pattern which is formed in the shape of a polygonal or round ring by arranging multiple pattern elements each of which has one of at least two colors; a symbol pattern placing area which is formed inside the frame pattern, and in which a symbol pattern can be placed, the symbol pattern being formed in the shape of a symbol by arranging multiple pattern elements each of which has one of at least two colors; an internal information pattern which is formed as a part of the frame pattern by arranging a predetermined number of pattern elements included in the pattern elements forming the frame pattern, and indicates the presence or the absence of the symbol pattern in the symbol pattern placing area; and a guide pattern which is placed on, inside or near the frame pattern, and is used for a visual code reading apparatus with an optical reading function to recognize a positional relationship between the frame pattern and the visual code reading apparatus.

A visual code reading apparatus according to another aspect of the present invention is an apparatus for optically reading the visual code attached to the article according to said one aspect of the present invention. The apparatus includes: a storing part for storing associated information which is linked to the symbol pattern and non-associated information which is not linked to the symbol pattern; an internal information recognition part for recognizing the positional relationship between the frame pattern and the visual code reading apparatus on the basis of the guide pattern, and recognizing the internal information pattern formed as the part of the frame pattern; an information reading part for determining whether or not the symbol pattern is placed in the symbol pattern placing area, on the basis of the internal information pattern recognized by the internal information recognition part, wherein the information reading part recognizes the symbol pattern and reads the associated information linked to the recognized symbol pattern from the storing part when the symbol pattern is placed in the symbol pattern placing area, and the information reading part reads the non-associated information from the storing part when the symbol pattern is not placed in the symbol pattern placing area; and an information output part for outputting the associated information or the non-associated information read by the information reading part.

An information conveying method according to yet another aspect of the present invention is a method including: generating a visual code, the visual code comprising: a frame pattern which is formed in the shape of a polygonal or round ring by arranging a plurality of pattern elements each of which has one of at least two colors; a symbol pattern placing area which is formed inside the frame pattern, and in which a symbol pattern can be placed, the symbol pattern being formed in the shape of a symbol by arranging a plurality of pattern elements each of which has one of at least two colors; an internal information pattern which is formed as a part of the frame pattern by arranging a predetermined number of pattern elements included in the plurality of the pattern elements forming the frame pattern, and indicates the presence or the absence of the symbol pattern in the symbol pattern placing area; and a guide pattern which is placed on, inside or near the frame pattern, and is used for a visual code reading apparatus having an optical reading function to recognize a positional relationship between the frame pattern and the visual code reading apparatus; attaching the generated visual code to an article; reading the guide pattern with the visual code reading apparatus; recognizing the positional relationship between the frame pattern and the visual code reading apparatus on the basis of the read guide pattern, in the visual code reading apparatus; recognizing the internal information pattern formed as the part of the frame pattern, in the visual code reading apparatus; determining whether or not the symbol pattern is placed in the symbol pattern placing area, on the basis of the recognized internal information, in the visual code reading apparatus; recognizing the symbol pattern in the visual code reading apparatus and reading associated information which is linked to the symbol pattern, from a storing part of the visual code reading apparatus in the visual code reading apparatus, when the symbol pattern is placed in the symbol pattern placing area; reading non-associated information which is not linked to the symbol pattern, from the storing part in the visual code reading apparatus when the symbol pattern is not placed in the symbol pattern placing area; and outputting the read associated information or the read non-associated information from the visual code reading apparatus.

BRIEF DESCRIPTION OF THE SEVERAL VIEWS OF THE DRAWINGS

FIG. 10 shows combined information in a visual code in which symbol patterns are placed in a symbol pattern placing area in an embodiment of the present invention.

FIG. 11 shows combined information in a visual code in which any symbol patterns are not placed in a symbol pattern placing area in an embodiment of the present invention.

DETAILED DESCRIPTION OF THE INVENTION (Principle of Conveyance of Information)

Figure 1:
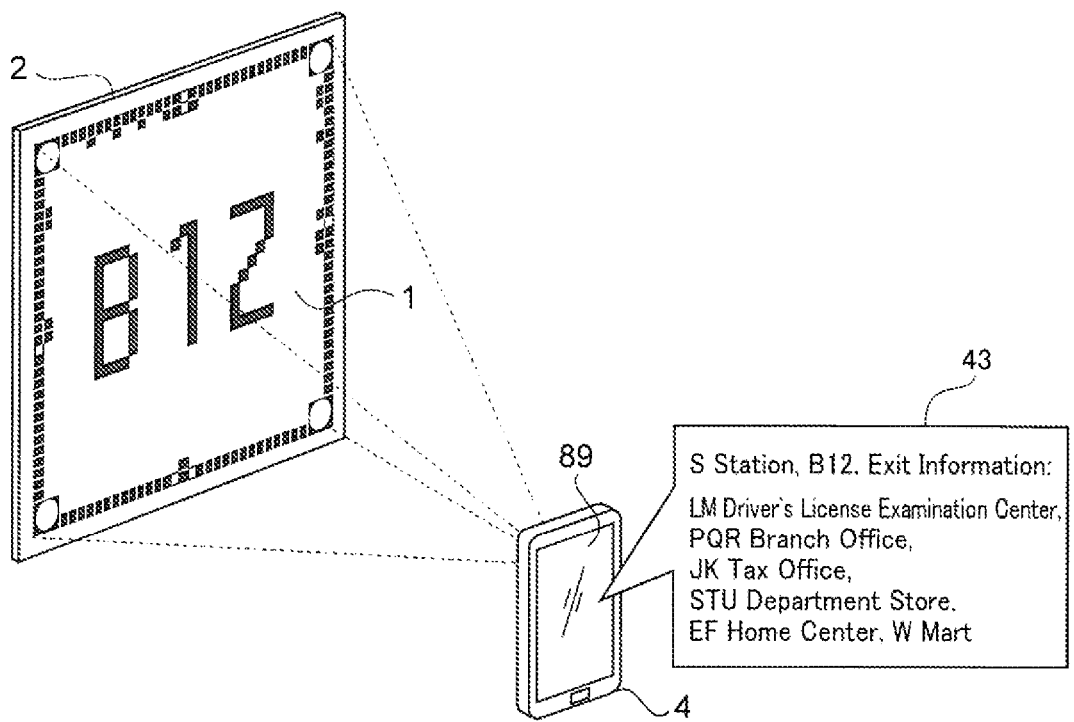
FIG. 1 shows an outline of conveyance of information through an article with a visual code in which symbol patterns are placed in a symbol pattern placing area in an embodiment of the present invention.
Figure 2:
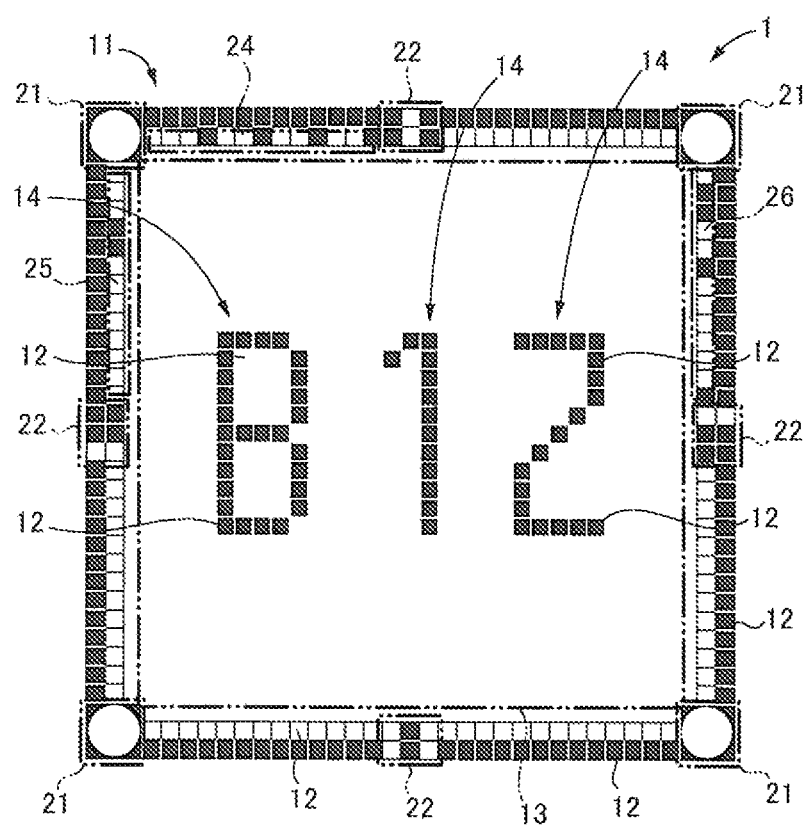
FIG. 2 shows an external configuration of a visual code in which symbol patterns are placed in a symbol pattern placing area in an embodiment of the present invention.

FIG. 1 shows the principle of conveyance of information through an article to which a visual code of an embodiment of the present invention is attached. FIG. 2 shows an external configuration of the visual code shown in FIG. 1.

The conveyance of information through an article to which a visual code 1 of an embodiment of the present invention is attached is performed in the following manner. First, the visual code 1, an example of which is shown in FIG. 1, is generated by a visual code generating apparatus 3 (see FIG. 12). The visual code 1 is a code having the function of visually and directly conveying a message to humans and indirectly conveying information linked to the message to humans by using an apparatus with an optical reading function.

The visual code 1, as shown in FIG. 2, is formed by placing symbol patterns 14 or an image 31 (see FIG. 4) in a symbol pattern placing area 13 formed inside a frame pattern 11, and forming internal information patterns 24, 25 and 26 as parts of the frame pattern 11. The internal information patterns 24, 25 and 26 express information which indicates whether or not the symbol pattern(s) 14 is placed in the symbol pattern placing area 13. When the symbol pattern(s) 14 is placed in the symbol pattern placing area 13, the internal information patterns 24, 25 and 26 further express information which indicates a layout of the symbol pattern(s) 14 in the symbol pattern placing area 13.

In an example of the visual code 1 shown in FIG. 1, three symbol patterns 14 are placed in the symbol pattern placing area 13. These symbol patterns 14 express a message: "B12". The message shows that the number of an exit of a subway (or underground) station is "B12". Associated information 43 is linked to the array of symbol patterns 14. In the example of the visual code 1 shown in FIG. 1, the associated information 43 is "S Station, B12, Exit Information: LM Driver's License Examination Center, PQR Branch Office, . . . ". This means that it is convenient to use the exit of No. B12 to go to the facilities listed here from the S station. Further, in the example of the visual code 1 shown in FIG. 1, the internal information patterns 24, 25 and 26 express information which indicates that the symbol patterns 14 are placed in the symbol pattern placing area 13 and indicates the layout of the symbol patterns 14 in the symbol pattern placing area 13.

Secondly, combined information 41 (see FIG. 10) generated by the visual code generating apparatus 3 is transferred to a visual code reading apparatus 4, which is a device or an apparatus having an optical reading function, and the combined information is stored in a storing part 86 (see FIG. 14) of the visual code reading apparatus 4. The combined information is information which is generated by the visual code generating apparatus in the process of generating the visual code 1. As shown in FIG. 1, when the symbol patterns 14 are placed in the symbol pattern placing area 13, the combined information is information which indicates the combination of the array of the symbol patterns 14 and the associated information 43 which is linked to this array of the symbol patterns 14. Furthermore, the example shown in FIG. 1, a smart phone with a camera is depicted as an example of the visual code reading apparatus 4.

Thirdly, the visual code 1 generated by the visual code generating apparatus 1 is attached to an article, and the article to which the visual code 1 is attached is placed in a place where people can see. In the example shown in FIG. 1, an information board 2 is an example of the article. Concretely, the visual code 1 is printed on the information board 2, and the information board 2 on which the visual code 1 is printed is placed near the exit of No. B12 of the subway station. Incidentally, the term "attach" used in the description is broadly interpreted. For example, the meaning of the term "attach" used in the description includes print, carve, engrave, write, stick, paste, etc., in addition to the original meaning of "attach". Further, "attach" includes displaying the visual code 1 in a screen of a display (e.g., a liquid crystal display).

Fourth, the visual code 1 attached to the article placed in the place where people can see is read by the visual code reading apparatus 4. For example, the user of the subway station takes an image of the visual code 1 with the visual code reading apparatus 4. The visual code reading apparatus 4 reads the visual code 1 from the taken image, and recognizes the internal information patterns 24, 25, 26 in the read visual code 1. Next, the visual code reading apparatus 4 determines that the symbol patterns 14 are placed in the symbol pattern placing area 13, and also determines the layout of the symbol patterns 14 in the symbol pattern placing area 13, on the basis of the internal information patterns 24, 25, 26. Next, the visual code reading apparatus 4 recognizes the symbol patterns 14 placed in the symbol pattern placing area 13 of the read visual code 1. Next, the visual code reading apparatus 4 specifies the associated information 43 linked to the array of the recognized symbol patterns 14, on the basis of the combined information stored in the storing part 86 of the visual code reading apparatus 4, and displays the specified associated information 43 in a displaying part 89 (see FIG. 14) of the visual code reading apparatus 4. For example, the user of the subway station can see the associated information 43, namely, the exit information on the exit No. B12 displayed in the displaying part 89, and can decide whether or not to use the exit.

In such a manner, the information board 2 to which the visual code 1 is attached can visually and directly convey a message ("B12", for example) and can indirectly and accurately convey information (the associated information 43, namely, the exit information, for example) by using the visual code reading apparatus 4.

Figure 3:
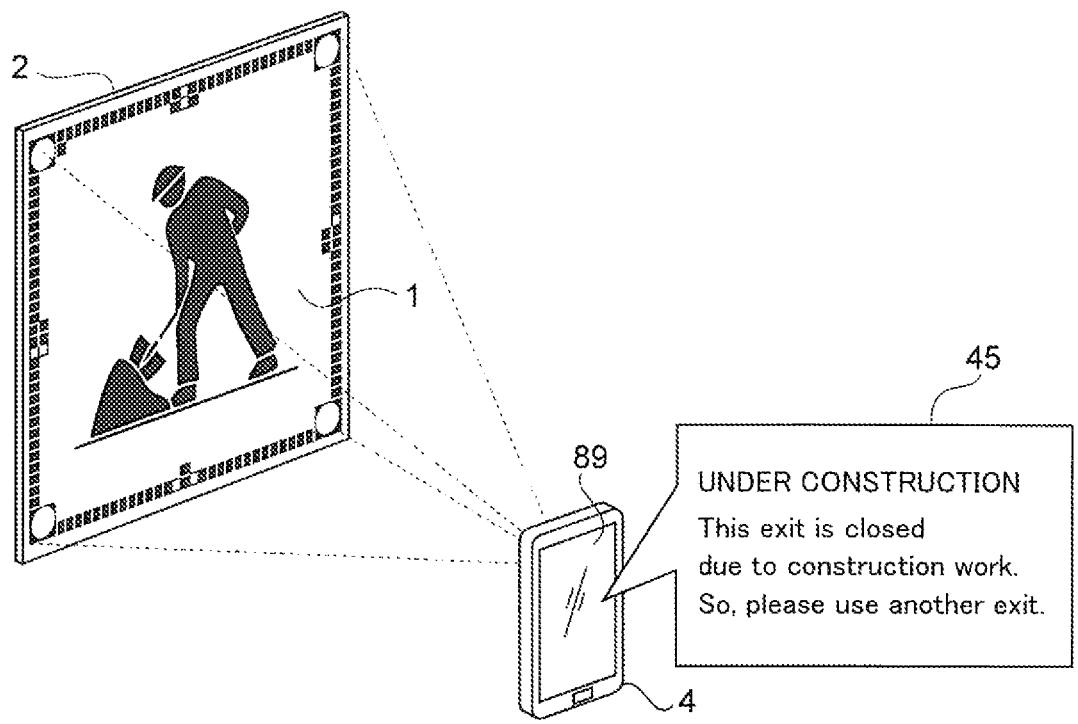
FIG. 3 shows an outline of conveyance of information through an article with a visual code in which any symbol patterns are not placed in a symbol pattern placing area in an embodiment of the present invention.
Figure 4:
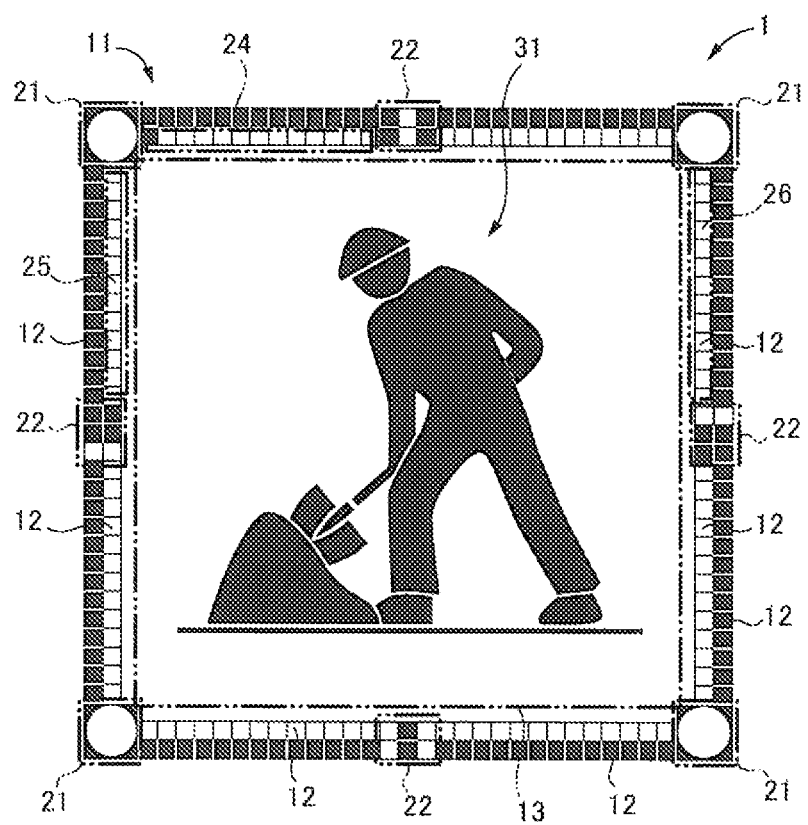
FIG. 4 shows an external configuration of a visual code in which any symbol patterns are not placed in a symbol pattern placing area in an embodiment of the present invention.

FIG. 3 shows the principle of conveyance of information through an article to which the visual code 1 in which the image 31 is placed in the symbol pattern placing area 13 is attached. FIG. 4 shows an external configuration of the visual code shown in FIG. 3.

As shown in FIG. 3, the visual code generating apparatus can generate the visual code 1 in which any symbol patterns 14 are not placed in the symbol pattern placing area 13, but the image 31 is placed in the symbol pattern placing area 13. The image 31, as shown in FIG. 4, is a picture or an illustration indicating that an exit of a subway station is under construction, for example. The image 31 is not formed by pattern elements 12 described later. The image 31 is formed by using smoothly curved lines, which cannot be made out of the array of the pattern elements 12.

Non-associated information 45 is linked to the visual code 1 (or the frame pattern 11) in which any symbol patterns 14 are not placed in the symbol pattern placing area 13. In an example shown in FIG. 3, the non-associated information 45 is "This exit is closed due to construction work. So, please use another exit." Namely, the non-associated information 45 indicates a notice that the exit is under construction, and a request for the user of the subway station to use another exit. Further, the internal information pattern 24 in the visual code 1 shown in FIG. 3 expresses information which indicates that any symbol patterns 14 are not placed in the symbol pattern placing area 13.

As shown in FIG. 3, when any symbol patterns 14 are not placed in the symbol pattern placing area 13, the combined information 41 which is to be stored to the storing part 86 of the visual code reading apparatus 4 is the combination of symbol pattern absence information and the non-associated information 45 (see FIG. 11).

In the example shown in FIG. 3, the visual code 1 is printed on the information board 2, and the information board 2 on which the visual code 1 is printed is placed near the exit of the subway station which is under construction.

When the user of the subway station takes an image of the visual code 1 shown in FIG. 3 with the visual code reading apparatus 4, the visual code reading apparatus 4 reads the visual code 1 from the taken image, and recognizes the internal information pattern 24 in the read visual code 1. Next, the visual code reading apparatus 4 determines that any symbol patterns 14 are not placed in the symbol pattern placing area 13, on the basis of the read internal information pattern 24. In this case, the visual code reading apparatus 4 does not perform the process of recognizing the symbol patterns 14. Next, the visual code reading apparatus 4 specifies the non-associated information 45 linked to the read visual code 1 on the basis of the combined information 41 stored in the storing part 86 of the visual code reading apparatus 4, and displays the specified non-associated information 45 in the displaying part 89 of the visual code reading apparatus 4. For example, the user of the subway station can see the non-associated information 45, and can obtain information related to the construction work of the exit.

In such a manner, the visual code 1 can use not only the symbol patterns 14 but also the image 31 as a medium for expressing a message. Further, like the visual code 1 in which the symbol patterns 14 are placed in the symbol pattern placing area 13, the visual code 1 in which the image 31 is placed in the symbol pattern placing area 13 can indirectly and accurately convey information (the non-associated information 45, namely, the notice that the exit is under construction, etc., for example) linked to the message to humans through the visual code reading apparatus 4. The visual code 1 can use photographs, letters written by hand, symbols with an elaborate shape, decorated characters, and objects, etc., as a medium for expressing a message, in addition to images and illustrations, such as the image 31.

(Configuration of Flame Pattern)

Figure 5:
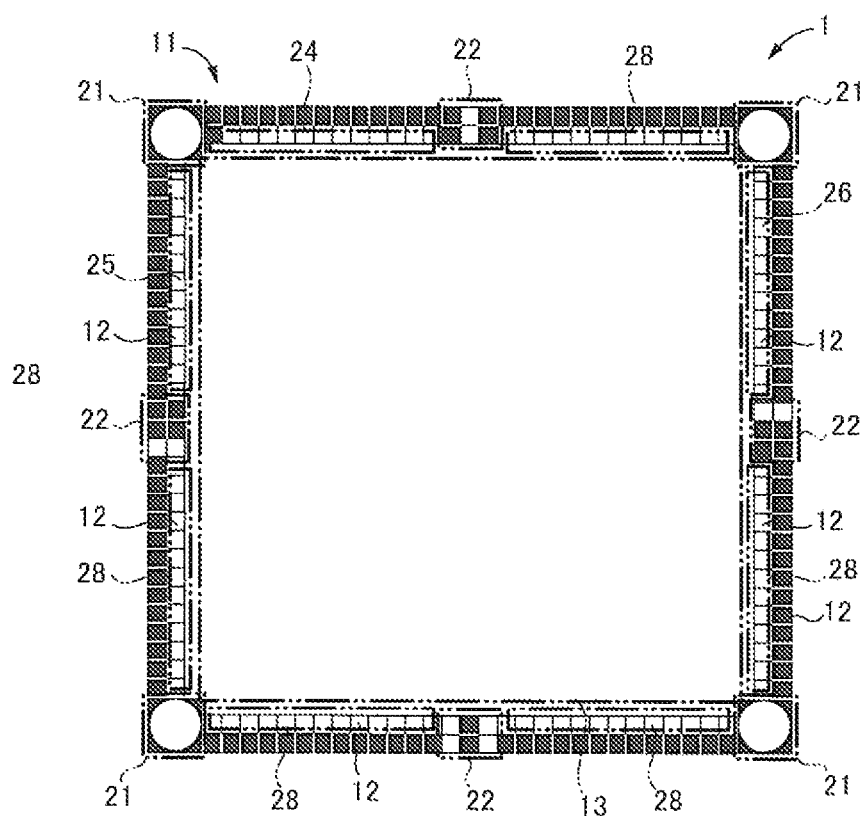
FIG. 5 shows a frame pattern in a visual code in an embodiment of the present invention.

FIG. 5 shows a configuration of the flame pattern 11. The flame pattern 11 is a pattern formed in the shape of a polygonal or round frame, ring or loop, by arranging multiple pattern elements 12 having one of at least two colors. Namely, the outside shape of the flame pattern 11 is polygonal or round, and, as shown in FIG. 5, there is a large empty space inside the frame pattern 11. In this embodiment, each pattern element 12 has either one of white and black colors, and the frame pattern 11 is formed in the shape of a rectangular ring by arranging the multiple pattern elements 12. The shape of each pattern element 12 is, for example, rectangular. For example, assuming that each white pattern element 12 corresponds to "0", and each black pattern element 12 corresponds to "1", a binary information can be expressed by the array of the white pattern elements 12 and the black pattern elements 12 in an X direction (a lateral direction) or a Y direction (a longitudinal direction). The symbol pattern placing area 13 is formed inside the frame pattern 11. Namely, the large inside empty space of the frame pattern 11 is the symbol pattern placing area 13.

Guide patterns 21, 22, the internal information patterns 24, 25, 26 and an optional pattern 28 are formed on the frame pattern 11. Namely, these patterns are formed as parts of the frame pattern 11. As for the internal information patterns 24, 25, 26 and the optional pattern 28, each pattern is formed by arranging a predetermined number (e.g. thirteen, as shown in FIG. 5) of pattern elements 12 included in the pattern elements 12 forming the frame pattern 11.

The guide patterns 21 and 22 are patterns which make it possible for the visual code reading apparatus 4 to recognize the positional relationship between the visual code reading apparatus 4 and the frame pattern 11 when the visual code reading apparatus 4 reads the visual code 1. The visual code reading apparatus 4 can recognize the position, direction, size, etc. of the frame pattern 11 by reading the guide patterns 21 or 22. The guide patterns 21 are placed at four corners of the frame pattern 11, respectively. The guide patterns 22 are placed at the middle part of the upper side, the middle part of the lower side, the middle part of the left side, and the middle part of the right side of the frame pattern 11, respectively. Incidentally, a guide pattern with a different aspect from the aspect of the guide pattern 21 or 22 shown in FIG. 5 can be employed. Concretely, a guide pattern with a different shape from the shape of guide pattern 21 or 22 can be employed. Further, the guide pattern 21 or 22 may be placed inside the frame pattern 11. Furthermore, the guide pattern 21 or 22 may be placed outside the frame pattern 11 and near the frame pattern 11. For example, the guide pattern 21 or 22 may be placed adjacent to the frame pattern 11.

The internal information patterns 24, 25 and 26 express information which indicates whether or not the symbol pattern(s) 14 is placed in the symbol pattern placing area 13 (i.e., information which indicates the presence or the absence of the symbol pattern(s) 14 in the symbol pattern placing area 13). When the symbol pattern(s) 14 is placed in the symbol pattern placing area 13, the internal information patterns 24, 25 and 26 further express information which indicates a layout of the symbol pattern(s) 14 in the symbol pattern placing area 13. The details of the internal information patterns 24, 25 and 26 are described later.

The optional pattern 28 can be placed depending on the needs of a designer of the visual code 1. The designer of the visual code 1 can assign any information to the optional pattern 28. The optional pattern 28 is not necessarily placed.

Incidentally, each of the guide patterns 21, 22, the internal information patterns 24, 25, 26 and the optional pattern 28 is not a pattern expressing a message which can be visually recognized by humans.

(Symbol Pattern)

Figure 6:
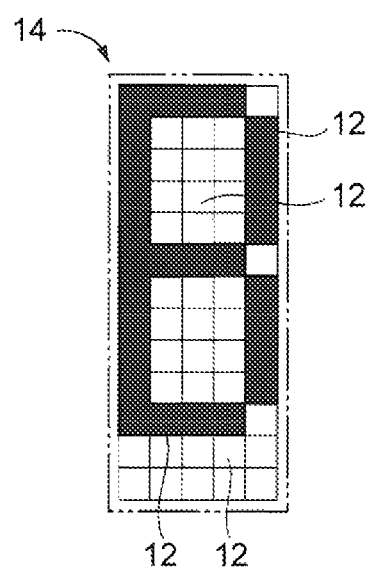
FIG. 6 shows a configuration of a symbol pattern in a visual code in an embodiment of the present invention.

FIG. 6 shows a configuration of the symbol pattern 14. As shown in FIG. 6, the symbol pattern 14 is a pattern formed in the shape of a symbol by arranging the multiple pattern elements 12 having one of at least two colors. In this embodiment, each pattern element 12 has either one of white and black colors. Further, in this embodiment, the symbol pattern 14 is formed by the sixty five pattern elements 12. These pattern elements 12 are arranged in the shape of a rectangle as a whole by arranging five pattern elements 12 in an X direction and arranging thirteen pattern elements 12 in a Y direction. In the arrangement of the sixty five pattern elements 12, a symbol itself is formed by the arrangement of the pattern elements 12 with a black color, and the background of the symbol is formed by the arrangement of the pattern elements 12 with a white color. For example, the symbol pattern shown in FIG. 6 expresses "B".

Figure 7:
FIG. 7 shows symbol patterns which can be used in a visual code in an embodiment of the present invention.

FIG. 7 shows examples of the symbol patterns 14 which can be used in the visual code 1. As shown in FIG. 7, each of the symbol patterns 14 expressing numerals (0-9), letters of the alphabet (A-Z, a-z), and other symbols (!, ", #, $, %, &, ', (,), etc.) can be formed by arranging the sixty five pattern elements 12 with either one of white and black colors. Incidentally, the number of pattern elements 12 or the arrangement of the pattern elements 12 which forms the symbol pattern 14 is not limited. The kinds of symbols expressed by the symbol pattern 14 are not limited. In each symbol pattern 14, white and black may be reversed, or other colors may be used.

(Symbol Pattern Placing Area)

Figure 8:
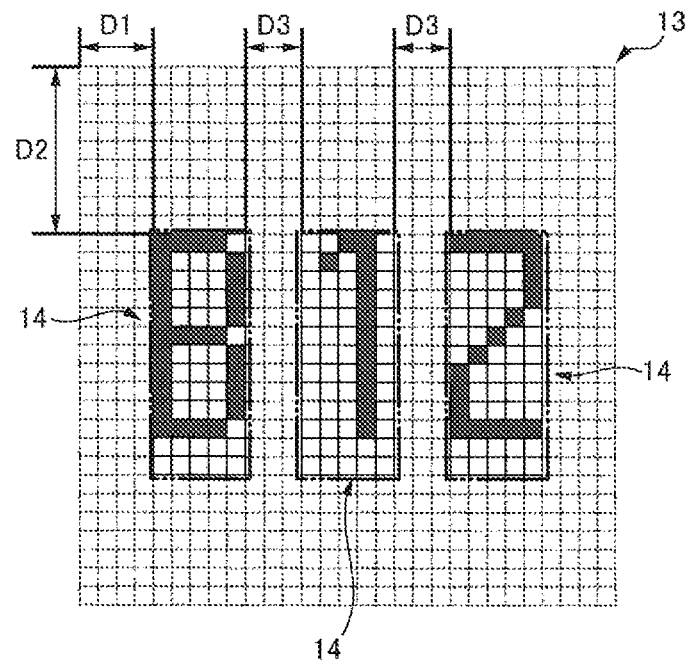
FIG. 8 shows an arrangement of symbol patterns in a symbol pattern placing area in a visual code in an embodiment of the present invention.

FIG. 8 shows the symbol pattern placing area 13. As shown in FIG. 8, in this embodiment, the outside shape of the symbol pattern placing area 13 is rectangular, and the symbol pattern placing area 13 has an area in which the twenty nine pattern elements 12 can be arranged in an X direction and the twenty nine pattern elements 12 can be arranged in a Y direction.

An user can make any layout of the symbol patterns 14 in the symbol pattern placing area 13. Concretely, as shown in FIG. 8, the user can set the positions of symbol patterns 14 in the symbol pattern placing area 13. More concretely, the user can set the X-direction offset D1 and the Y-direction offset D2 of the symbol patterns 14. The X-direction offset D1 means the amount (the number of regions) of the shift of the positions of the symbol patterns 14 in an X direction in the symbol pattern placing area 13. The Y-direction offset D2 means the amount (the number of regions) of the shift of the positions of the symbol patterns 14 in a Y direction in the symbol pattern placing area 13. For example, when the X-direction offset D1 is set at "1", the positions of the symbol patterns 14 are shifted rightward by the amount corresponding to one region. When the Y-direction offset D2 is set at "1", the positions of the symbol patterns 14 are shifted downward by the amount corresponding to one region.

Further, the user can set the space between the two symbol patterns 14. More concretely, the user can set the X-direction space D3 and the Y-direction space D4 between two symbol patterns 14. The X-direction space means the number of regions located between the two symbol patterns 14 adjacent to each other in an X direction. The Y-direction space means the number of regions located between the two symbol patterns 14 adjacent to each other in a Y direction.

Furthermore, the user can set the number of symbol patterns 14 arranged in an X direction (the number of symbols in a row) and the number of symbol patterns 14 arranged in an Y direction (the number of rows) in the symbol pattern placing area 13.

(Internal Information Pattern)

Figure 9:
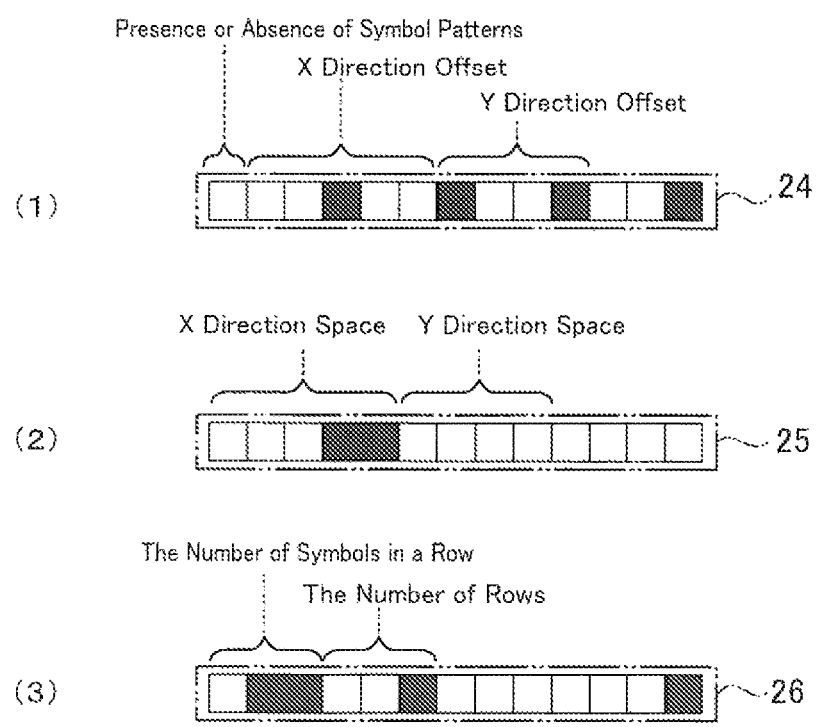
FIG. 9 show internal information patterns in a visual code in an embodiment of the present invention.

FIG. 9 shows the internal information patterns 24, 25 and 26. As shown in FIG. 9, in this embodiment, there are the three internal information patterns 24, 25 and 26. As shown in FIG. 5, the three internal information patterns 24, 25 and 26 are formed in the left part of the upper side, the upper part of the left side, and the upper part of the right side of the frame pattern 11, respectively.

As shown in FIG. 9(1), in the internal information pattern 24 formed in the left part of the upper side of the frame pattern 11, for example, the most significant bit (the left-most bit) expresses information which indicates whether or not the symbol pattern(s) 14 is placed in the symbol pattern placing area 13 (the presence or the absence of the symbol pattern(s) 14 in the symbol pattern placing area 13). When the symbol pattern(s) 14 is placed in the symbol pattern placing area 13, the pattern element 12 with, for example, a white color, which indicates "0", is placed at the position corresponding to the most significant bit of the internal information pattern 24. When any symbol patterns 14 are not placed in the symbol pattern placing area 13, the pattern element 12 with, for example, a black color, which indicates "1", is placed at the position corresponding to the most significant bit of the internal information pattern 24. Further, in the internal information pattern 24, the five bits following the most significant bit express information which indicates the X-direction offset of the symbol patterns 14, and the four bits following these five bits express information which indicates the Y-direction offset of the symbol patterns 14, and the two bits following these four bits are unused bits, and the one bit following these two bits is a parity bit. As shown in FIG. 5, the internal information pattern 24 is placed in the left part of the upper side of the frame pattern 11 in such a manner that the most significant bit is located on the left side of the part.

As shown in FIG. 9(2), in the internal information pattern 25 formed in the upper part of the left side of the frame pattern 11, for example, the upper five bits express information which indicates the X-direction space between the symbol patterns 14, and the four bits following these five bits express information which indicates the Y-direction space between the symbol patterns 14, and the three bits following these four bits are unused bits, and the one bit following these three bits is a parity bit. As shown in FIG. 5, the internal information pattern 25 is placed in the upper part of the left side in such a manner that the most significant bit is located on the upper side of the part.

As shown in FIG. 9(3), in the internal information pattern 26 formed in the upper part of the right side of the frame pattern 11, for example, the upper three bits express information which indicates the number of symbols in a row, and the three bits following these upper three bits express information which indicates the number of rows of the symbol patterns 14, and the six bits following these three bits are unused bits, and the one bit following these six bits is a parity bit. As shown in FIG. 5, the internal information pattern 26 is placed in the upper part of the right side in such a manner that the most significant bit is located on the upper side of the part.

(Combined Information)

FIGS. 10 and 11 show two types of the combined information, respectively. When the symbol pattern(s) 14 is placed in the symbol pattern placing area 13, as shown in FIG. 10, the combined information 41 is information which indicates the combination of the symbol pattern 14 (or the array of the symbol patterns 14) and the associated information 43 linked to this symbol pattern 14 (or this array of the symbol patterns 14). Concretely, in this case, the combined information 41 is the combination of message text information 42, which is text information corresponding to the symbol pattern 14 (or the array of the symbol patterns 14), and the associated information 43 linked to this symbol pattern 14 (or this array of the symbol patterns 14). When any symbol patterns 14 are not placed in the symbol pattern placing area 13, as shown in FIG. 11, the combined information 41 is the combination of the symbol pattern absence information 44 and the non-associated information 45. The symbol pattern absence information 44 may be information which is different from any message text information 42. For example, an unused character code may be used as the symbol pattern absence information 44.

The combined information 41 is generated by the visual code generating apparatus 3 in the process of generating the visual code 1. Thereafter, the combined information 41 is transferred to the visual code reading apparatus 4 from the visual code generating apparatus 3, and is stored to the storing part 86 of the visual code reading apparatus 4. Thereafter, when the user reads the visual code 1 attached to an article with the visual code reading apparatus 4, the visual code reading apparatus 4 refers the combined information 41 and specifies the associated information 43 or the non-associated information 45 corresponding to the read visual code 1. Then, the visual code reading apparatus 4 displays the specified associated information 43 or the specified non-associated information 45 in the displaying part 89.

Incidentally, the associated information 43 and the non-associated information 45 are text information (or text data) in this embodiment. However, these information 43 and 45 may be audio data, image data, video data, computer programs or the like.

(Visual Code Generating Apparatus)

Figure 12:
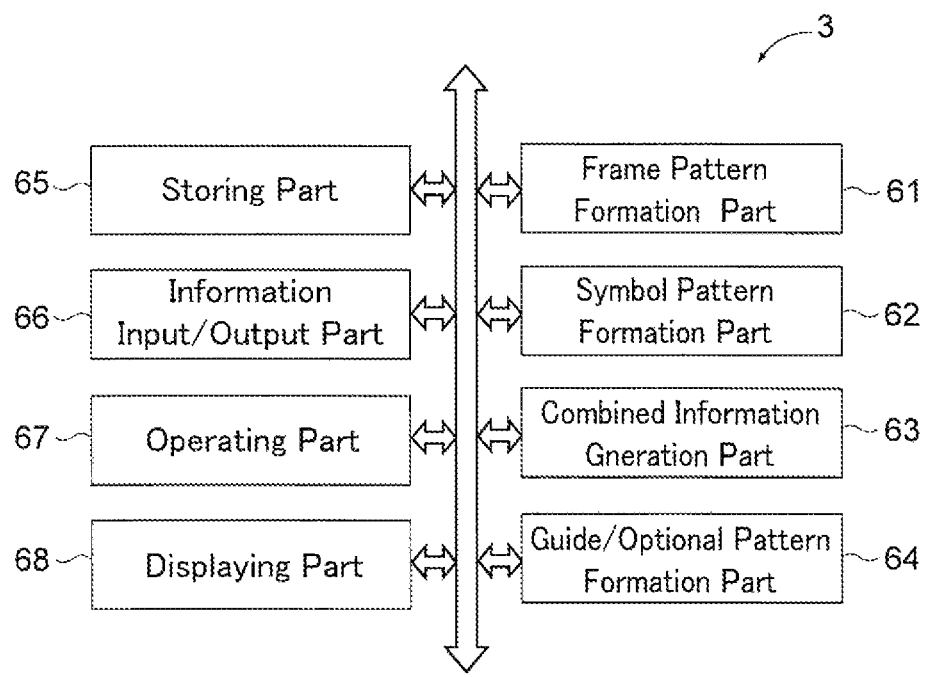
FIG. 12 shows a configuration of a visual code generating apparatus in an embodiment of the present invention.
Figure 13:
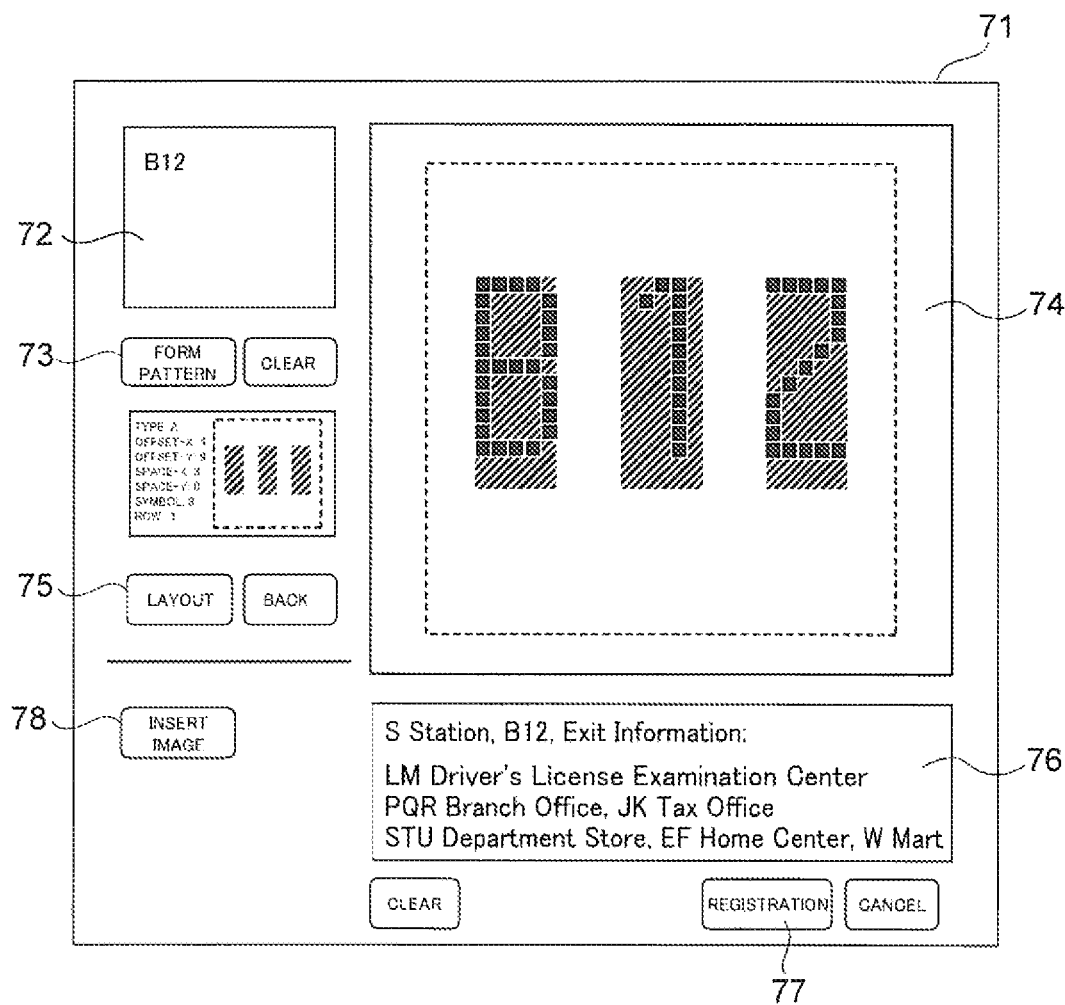
FIG. 13 shows a visual code generating screen of a visual code generating apparatus in an embodiment of the present invention.

FIG. 12 shows a configuration of the visual code generating apparatus. FIG. 13 shows a visual code generating screen displayed in a displaying part 68 of the visual code generating apparatus 3. In FIG. 12, the visual code generating apparatus 3 is an apparatus for generating the visual code 1. The visual code generating apparatus 3 can be realized by, for example, a personal computer or the like. The visual code generating apparatus 3 has a frame pattern formation part 61, a symbol pattern formation part 62, a combined information generation part 63, a guide/optional pattern formation part 64, a storing part 65, an information input/output part 66, an operating part 67 and a displaying part 68.

The frame pattern formation part 61 forms the frame pattern 11 and the internal information patterns 24, 25 and 26. The symbol pattern formation part 62 forms the symbol pattern(s) 14 in the visual code 1. The combined information generation part 63 generates the combined information 41. The guide/optional pattern formation part 64 forms the guide patterns 21, 22 and the optional pattern 28. For example, a CPU (Central Processing Unit) of the personal computer reads and executes computer programs designed so as to embody the frame pattern formation part 61, the symbol pattern formation part 62, the combined information generation part 63 and the guide/optional pattern formation part 64. These parts are realized by the personal computer in such a manner.

The storing part 65 has a storing medium or a storing device, such as a RAM (Random Access Memory), a flash memory, a hard disk drive, etc. For example, a storing medium or a storing device generally included in the personal computer can be used as the storing medium or the storing device of the storing part 65. The storing part 65 stores the combined information 41 and other information needed for generating the visual code 1.

The information input/output part 66 has: an interface for reading information from and writing information to an external memory device, such as a USB (Universal Serial Bus) memory, a memory card, etc.; a LAN (Local Area Network) interface for communicating with external apparatuses through a LAN; an optical disc drive; or the like. For example, a USB interface, a card memory interface, a LAN interface or an optical disc device generally included in the personal computer can be used as the USB interface, the card memory interface, the LAN interface or the optical disc device of the information input/output part 66.

The operating part 67 is, for example, a keyboard, a mouse and the like. The displaying part 68 is, for example, a liquid crystal display. For example, a keyboard and a mouse generally included in the personal computer can be used as the keyboard and the mouse of the operating part 67, and a liquid crystal display generally included in the personal computer can be used as the liquid crystal display of the displaying part 68.

The operation of the visual code generating apparatus 3 having such a configuration is as follows. First, when a user runs the visual code generating apparatus 3 (for example, the user turns on the personal computer and runs an operating system, and then runs the computer programs of the visual code generating apparatus 3), the displaying part 68 displays the visual code generation screen 71, an example of which is shown in FIG. 13. The visual code generation screen 71 is a screen for making it possible for the user to generate the visual code 1.

In the visual code generation screen 71, when the user wants to generate the visual code 1 in which the symbol pattern 14 is placed in the symbol pattern placing area 13, the user operates the operating part 67, and inputs a text or texts expressing a message which the user wants to visually convey through the visual code 1 (for example, "B12"), to a message input area 72. After finishing the input of the text(s), the user pushes a pattern formation button 73 (or clicks it with the mouse). In response to this, the symbol pattern formation part 62 displays the symbol pattern 14 or the array of the symbol patterns 14 corresponding to the text(s) input to the message input area 72, in a symbol pattern displaying area 74 of the visual code generation screen 71.

Further, the user can input values to set the X-direction offset, the Y-direction offset, the X-direction space, the Y-direction space, the number of symbols in a row, and the number of rows, by pushing (or clicking) a layout button 75. In response to the user's input, the symbol pattern formation part 62 sets the X-direction offset, the Y-direction offset, the X-direction space, the Y-direction space, the number of symbols in a row, and the number of rows of the symbol pattern(s) 14.

Next, in the visual code generation screen 71, the user operates the operating part 67, and inputs a text or texts expressing information which the user wants to convey through the visual code reading apparatus 4 (for example, "S Station, B12, Exit Information: LM Driver's License Examination Center, PQR Branch Office,"), to an information input area 76 of the visual code generation screen 71. After finishing the input of the text(s), the user pushes (or clicks) a registration button 77. In response to this, the combined information generation part 63 generates the combined information 41 by combining the text(s) input to the information input area 76 (i.e., the associated information 43) and the text(s) input to the message input area 72, and stores the combined information 41 to the storing part 65.

Next, the frame pattern formation part 61, the symbol pattern formation part 62 and the guide/operational pattern formation part 64 generate a "visual code pattern", which is all the patterns composing the outside view of the visual code 1, namely, includes the frame pattern 11 and symbol pattern(s) 14 (or the image 31). Concretely, the frame pattern formation part 61 forms the internal information patterns 24, 25 and 26 which indicate that the symbol pattern(s) 14 is placed in the symbol pattern placing area 13 and indicate the layout of the symbol pattern(s) 14 in the symbol pattern placing area 13. Further, the frame pattern formation part 61 and the guide/optional pattern formation part 64 form the frame pattern 11 in which the guide patterns 21, 22, the internal information patterns 24, 25, 26 and the optional pattern 28 are arranged thereon. Furthermore, the symbol pattern formation part 62 forms the symbol pattern(s) 14 corresponding to the text(s) input to the message input area 72 by the user, in the symbol pattern placing area 13. The visual code pattern formed in such a manner is stored to the storing part 65.

On the other hand, when the user wants to generate the visual code 1 in which the image 31 is placed in the symbol pattern placing area 13, the user pushes (or clicks) an image insertion button 78 in the visual code generation screen 71. In response to this, an image selection screen (not shown) is opened. The user can select any image in the image selection screen. The selected image is displayed in the symbol pattern displaying area 74.

Following this, the user inputs a text(s) expressing information which the user wants to convey through reading of the visual code 1 with the visual code reading apparatus 4 (for example, "This exit is closed due to construction work . . . ) to the information input area 76 in the visual code generation screen 71, and thereafter pushes (or clicks) the registration button 77. In response to this, the combined information generation part 63 generates the combined information 41 by combining the text(s) input in the information input area 76 (i.e., the non-associated information 45) and a symbol pattern absence information 44, and stores the combined information 41 to the storing part 65.

Following this, the frame pattern formation part 61, the symbol pattern formation part 62, and the guide/optional pattern formation part 64 generate the visual code pattern. Concretely, the frame pattern formation part 61 forms the internal information pattern 24 which indicates any symbol patterns 14 are not placed in the symbol pattern placing area 13. The frame pattern formation part 62 and the guide/optional pattern formation part 64 form the frame pattern 11 including the guide patterns 21, 22, the internal information patterns 24, 25, 26, and the optional pattern 28. The symbol pattern formation part 62 places the image selected by the user in the symbol pattern placing area 13. The visual code pattern generated in such a manner is stored to the storing part 65.

After the visual code pattern is stored to the storing part 65 of the visual code generating apparatus 3, the visual code generating apparatus 3 can output the visual code pattern and the combined information 41 through the information input/output part 66 according to a user's instruction. The user can obtain the visual code pattern from the visual code generating apparatus 3 by operating the visual code generating apparatus 3, and attach the visual code pattern to an article. Further, the user can input or transfer the combined information 41 output from the visual code generating apparatus 3 to the visual code reading apparatus 4, and can store the combined information 41 to the storing part 86 of the visual code reading apparatus 4.

(Visual Code Reading Apparatus)

Figure 14:
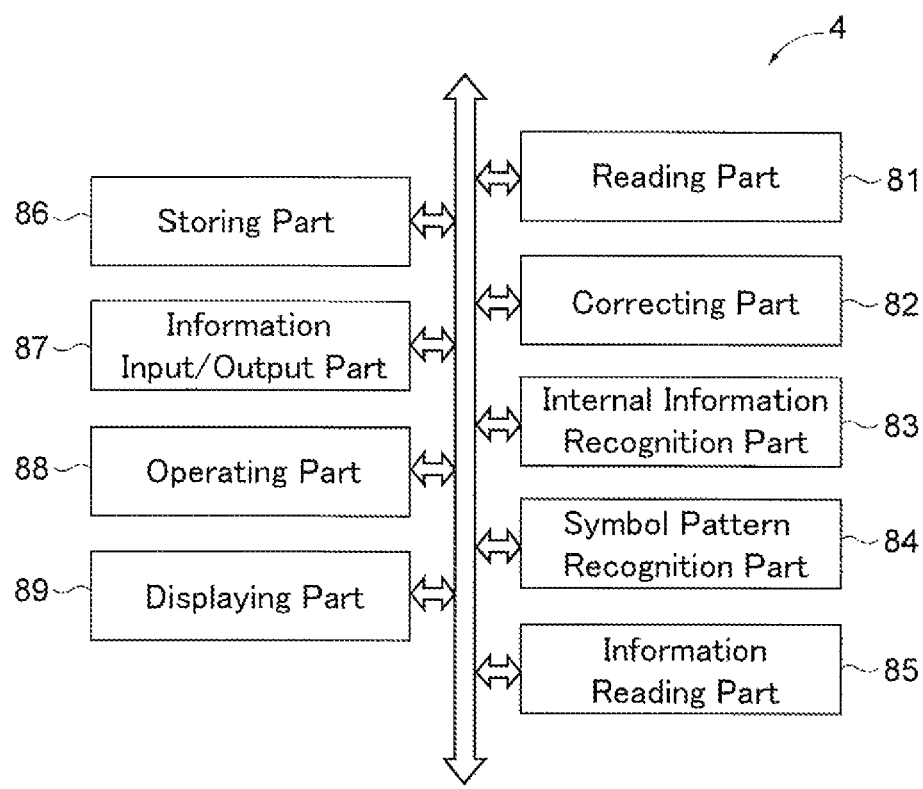
FIG. 14 shows a configuration of a visual code reading apparatus in an embodiment of the present invention.
Figure 15:
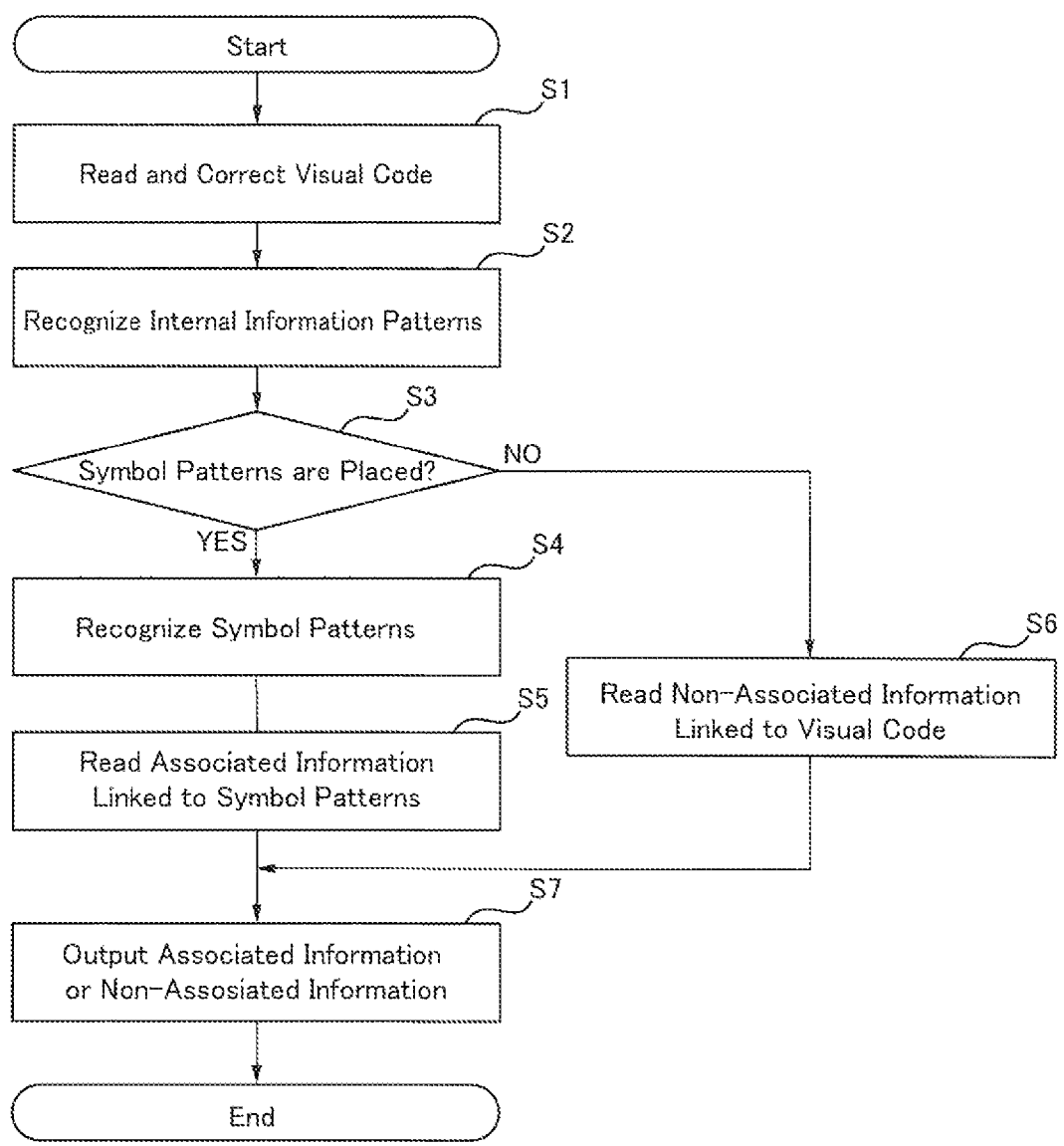
FIG. 15 shows an operation of a visual code reading apparatus in an embodiment of the present invention.

FIG. 14 shows a configuration of the visual code reading apparatus 4. FIG. 15 shows a visual code reading process performed by the visual code reading apparatus 4. In FIG. 14, the visual code reading apparatus 4 is an apparatus for reading the visual code 1 attached to an article. For example, the visual code reading apparatus 4 is embodied in a terminal device, such as a smart phone etc., or a code reader device etc. The visual code reading apparatus 4 has a reading part 81, a correcting part 82, an internal information recognition part 83, symbol pattern recognition part 84, an information reading part 85, the storing part 86, an information input/output part 87, an operating part 88, and a displaying part 89.

The reading part 81 is, for example, a scanner, a camera or the like. The reading part 81 optically reads the visual code 1 attached to an article. The reading part 81 can reads the visual code 1 attached to an article from a place distant from the article.

The correcting part 82 corrects the result of the reading of the visual code 1 (i.e., the position, direction, etc. of the visual code 1 read by the reading part 81) on the basis of the guide patterns 21 and 22.

The internal information recognition part 83 recognizes the internal information patterns 24, 25 and 26 in the visual code 1 read by the reading part 81.

The symbol pattern recognition part 84 recognizes the symbol pattern(s) 14 in the symbol pattern placing area 13 of the visual code 1 read by the reading part 81, when the symbol pattern(s) 14 is placed in the symbol pattern placing area 13.

The information reading part 85 specifies the associated information 43 linked to the symbol pattern 14 or the array of the symbol patterns 14 in the visual code 1 read by the reading part 81, or the non-associated information 45 linked to the visual code 1 (or the frame pattern 11), and reads the specified associated information 43 or the specified non-associated information 45 from the storing part 86.

The correction part 82, the internal information recognition part 83, the symbol pattern recognition part 84, and the information reading part 85 are realized by computer programs read and executed by the visual code reading apparatus 4.

The storing part 86 has a recording medium, such as a RAM, a flash memory or the like. The combined information 41 etc. are stored in the storing part 86.

The information input/output part 87 is a communication interface, such as a connection interface to a USB memory, a card memory, etc., a LAN interface or the like.

The operating part 88 is a keyboard, switches or the like for operating the visual code reading apparatus 4. The displaying part 89 is, for example, a liquid crystal display.

The visual code reading apparatus 4 having such a configuration performs the visual code reading process described below. Before beginning the visual code reading process of the visual code reading apparatus 4, the user inputs the combined information 41 generated by the visual code generating apparatus 3 and output from the visual code generating apparatus 3, to the visual code reading apparatus 4 through the information input/output part 87 of the visual code reading apparatus 4, and stores the combined information 41 to the storing part 86. For example, assuming that the user generates both of the visual code 1 shown in FIG. 2 and the visual code 1 shown in FIG. 4 with the visual code generating apparatus 3, the user stores two pieces of the combined information 41 corresponding to the two visual codes 1 to the storing part 86.

As a result of storing these combined information 41, the associated information 43 and the non-associated information 45 are stored in the storing part 86. Following this, the user points the reading part 81 of the visual code reading apparatus 4 at the visual code 1 attached to an article, and operates the operating part 88 to start the reading operation of the reading part 81. In response to this, the visual code reading apparatus 4 starts the visual code reading process.

As shown in FIG. 15, in the visual code reading process, first, the reading part 81 optically reads the visual code 1 attached to the article by taking an image of the visual code 1 or scanning the visual code 1, and the correcting part 82 recognizes the guide patterns 21 and 22 in the visual code 1 read by the reading part 81 (step S1). Then, the correcting part 82 recognizes the positional relationship between the visual code 1 and the visual code reading apparatus 4 on the basis of the guide patterns 21 and 22. In case where the positional relationship is not good, the reading part 81 repeatedly reads the visual code 1 until a good positional relationship is obtained. During this time, the user adjusts the position or direction of the visual code reading apparatus 4 with respect to the visual code 1 attached to the article. After a good positional relationship between the visual code 1 and the visual code reading apparatus 4 is obtained, the correction part 82 corrects the result of reading of the visual code 1 on the basis of the guide patterns 21 and 22. Concretely, the correcting part 82 determines whether or not the reading direction of the visual code 1 is correct, on the basis of the shapes or the arrangements of the guide patterns 21, 22. When the reading direction is not correct, the correcting part 82 rotates the visual code pattern (i.e., all of the patterns composing the outside view of the visual code 1) read by the reading part 81 to obtain the correct direction of the visual code pattern. Further, the correcting part 82 corrects a misalignment of the reading position of the visual code pattern or a distortion of the image of the visual code pattern on the basis of the shapes or the arrangements of the guide patterns 21, 22. Furthermore, the correcting part 82 increases the contrast of the image of the visual code pattern and removes noise from the image of the visual code pattern.

Following this, the internal information recognition part 83 recognizes the internal information 24, 25 and 26 in the visual code 1 read by the reading part 81 (step S2). Then, the internal information recognition part 83 determines whether or not the symbol pattern(s) 14 is placed in the symbol pattern placing area 13, on the basis of the recognized internal information patterns 24 (step S3).

When the symbol pattern(s) 14 is placed in the symbol pattern placing area 13 of the visual code 1 read by the reading part 81 (step S3: YES), the symbol pattern recognition part 84 recognizes the layout of the symbol pattern(s) 14 on the basis of the internal information pattern 24, 25 and 26, and recognizes the symbol pattern(s) 14 (step S4). Then, the symbol pattern recognition part 84 recognizes the optional pattern 28 as needed.

Following this, the information reading part 85 refers to the combined information 41 stored in the storing part 86, and specifies the associated information 43 linked to the recognized symbol pattern 14 or the recognized array of the symbol patterns 14, and then reads the specified associated information 43 from the storing part 86 (step S5).

On the other hand, when any symbol pattern 14 are not placed in the symbol pattern placing area 13 of the visual code 1 read by the reading part 81 (step S3: NO), the symbol pattern recognition part 84 does not perform the process of recognizing the symbol pattern(s) 14. Then, the symbol pattern recognition part 84 recognizes the optional pattern 28 as needed.

Following this, the information reading part 85 refers to the combined information 41 stored in the storing part 86, and specifies the non-associated information 45 linked to the visual code 1 (or the frame pattern 11) read by the reading part 81, and then reads the specified non-associated information 45 from the storing part 86 (step S6).

Following this, the information input/output part 87 outputs the associated information 43 read in step S5 or the non-associated information 45 read in step S6 to the displaying part 89 (step S7). As a result, the associated information 43 or the non-associated information 45 is displayed by the displaying part 89.

When the symbol pattern(s) 14 is placed in the symbol pattern placing area 13 of the visual code 1 attached to the article, the user can visually obtain a message expressed by the symbol pattern 14 or the array of the symbol patterns 14, At the same time, the user can obtain the associated information 43 linked to the symbol pattern 14 or the array of the symbol patterns 14 by seeing the displaying part 89 of the visual code reading apparatus 4. On the other hand, when the image 31 is placed in the symbol pattern placing area 13 of the visual code 1 attached to the article, the user can visually obtain a message expressed by the image 31. At the same time, the user can obtain the non-associated information 45 linked to the visual code 1 (or the frame pattern 11) by seeing the displaying part 89 of the visual code reading apparatus 4. In such a manner, the visual code 1 of the present embodiment can use not only the symbol pattern(s) 14 but also the image 31 as a medium for expressing a message. Therefore, it is possible to increase the design, appeal or allure of an article or a product. The visual code 1 using the image 31 can make a message which can more directly or more clearly convey information and has greater emotional impact in comparison with the visual code 1 using only the symbol pattern(s) 14.

Figure 16:
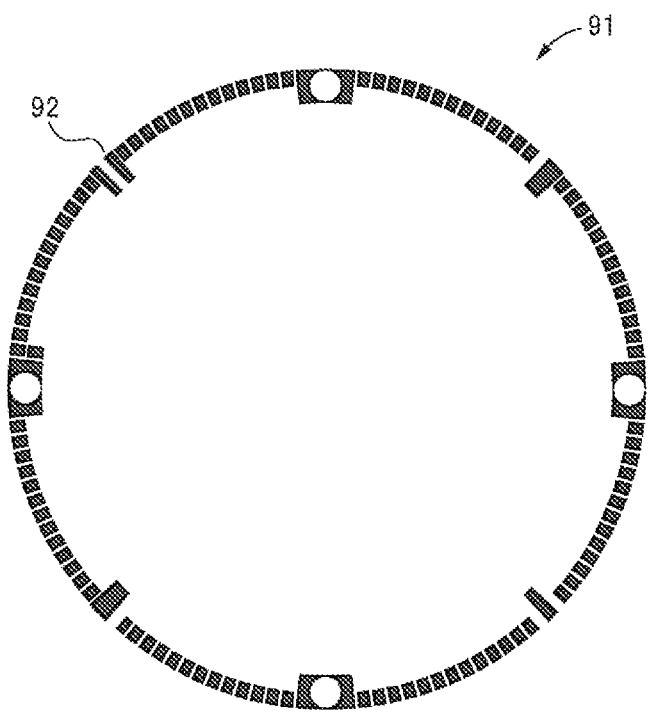
FIG. 16 shows a frame pattern in a visual code in another embodiment of the present invention.

Incidentally, as shown in FIG. 5, the above-described visual code 1 has the frame pattern 11 formed in the shape of a rectangle. However, the present invention is not limited to this. For example, the embodiments of the present invention include a visual code 91 with a frame pattern 92 formed in the shape of a circle, as shown in FIG. 16. Also, the embodiments of the present invention include a visual codes with a frame pattern formed in the shape of a polygon, such as a triangle, a pentagon, a hexagon or the like, in addition to a rectangle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. An article to which a visual code is attached, wherein the visual code comprises:
   a frame pattern which is formed in a shape of a polygonal or round ring by arranging a first plurality of pattern elements each of which has one of at least two colors;
   a symbol pattern placing area which is formed inside the frame pattern, and in which a symbol pattern can be placed, the symbol pattern being formed in a shape of a symbol by arranging a second plurality of pattern elements each of which has one of at least two colors;
   an internal information pattern which is formed as a part of the frame pattern by arranging a predetermined number of pattern elements included in the first plurality of the pattern elements forming the frame pattern, and indicates the presence or the absence of the symbol pattern in the symbol pattern placing area; and
   a guide pattern which is placed on, inside or near the frame pattern, and is used for a visual code reading apparatus having an optical reading function to recognize a positional relationship between the frame pattern and the visual code reading apparatus.

2. The article according to claim 1, wherein the internal information pattern further indicates a layout of the symbol pattern in the symbol pattern placing area.

3. A visual code reading apparatus for optically reading the visual code attached to the article according to claim 1, comprising:
   a storing part for storing associated information which is linked to the symbol pattern and non-associated information which is not linked to the symbol pattern;
   an internal information recognition part for recognizing the positional relationship between the frame pattern and the visual code reading apparatus on a basis of the guide pattern, and recognizing the internal information pattern formed as the part of the frame pattern;
   an information reading part for determining whether or not the symbol pattern is placed in the symbol pattern placing area, on a basis of the internal information pattern recognized by the internal information recognition part, wherein the information reading part recognizes the symbol pattern and reads the associated information linked to the recognized symbol pattern from the storing part when the symbol pattern is placed in the symbol pattern placing area, and the information reading part reads the non-associated information from the storing part when the symbol pattern is not placed in the symbol pattern placing area; and
   an information output part for outputting the associated information or the non-associated information read by the information reading part.

4. An information conveying method comprising:
   generating a visual code, the visual code comprising: a frame pattern which is formed in a shape of a polygonal or round ring by arranging a first plurality of pattern elements each of which has one of at least two colors; a symbol pattern placing area which is formed inside the frame pattern, and in which a symbol pattern can be placed, the symbol pattern being formed in a shape of a symbol by arranging a second plurality of pattern elements each of which has one of at least two colors; an internal information pattern which is formed as a part of the frame pattern by arranging a predetermined number of pattern elements included in the first plurality of the pattern elements forming the frame pattern, and indicates the presence or the absence of the symbol pattern in the symbol pattern placing area; and a guide pattern which is placed on, inside or near the frame pattern, and is used for a visual code reading apparatus having an optical reading function to recognize a positional relationship between the frame pattern and the visual code reading apparatus;
   attaching the generated visual code to an article;
   reading the guide pattern with the visual code reading apparatus;
   recognizing the positional relationship between the frame pattern and the visual code reading apparatus on a basis of the read guide pattern, in the visual code reading apparatus;

recognizing the internal information pattern formed as the part of the frame pattern, in the visual code reading apparatus;

determining whether or not the symbol pattern is placed in the symbol pattern placing area, on a basis of the recognized internal information, in the visual code reading apparatus;

recognizing the symbol pattern in the visual code reading apparatus and reading associated information which is linked to the symbol pattern, from a storing part of the visual code reading apparatus in the visual code reading apparatus, when the symbol pattern is placed in the symbol pattern placing area;

reading non-associated information which is not linked to the symbol pattern, from the storing part in the visual code reading apparatus when the symbol pattern is not placed in the symbol pattern placing area; and outputting the read associated information or the read non-associated information from the visual code reading apparatus.

* * * * *